US008405360B2

(12) United States Patent
Young et al.

(10) Patent No.: US 8,405,360 B2
(45) Date of Patent: Mar. 26, 2013

(54) ENERGY-EFFICIENT FAST CHARGING DEVICE AND METHOD

(75) Inventors: James Young, Taipei (TW); Yaw-Chung Cheng, Taipei (TW); Hao-Chung Chang, Taipei (TW)

(73) Assignee: EVP Technology LLC USA, Wilmington, DE (US)

( * ) Notice: Subject to any disclaimer, the term of this patent is extended or adjusted under 35 U.S.C. 154(b) by 370 days.

(21) Appl. No.: 12/755,419

(22) Filed: Apr. 7, 2010

(65) Prior Publication Data

US 2011/0248683 A1    Oct. 13, 2011

(51) Int. Cl.
*H02J 7/00* (2006.01)
*C03B 29/00* (2006.01)

(52) U.S. Cl. ........ 320/137; 320/103; 320/104; 320/107; 320/109; 320/111; 320/113; 320/115; 320/138; 320/160; 320/166; 320/167

(58) Field of Classification Search .................. 320/103, 320/104, 107, 109, 111, 113, 115, 137, 138, 320/160, 166, 167
See application file for complete search history.

(56) References Cited

U.S. PATENT DOCUMENTS

| 5,803,215 | A   | * | 9/1998  | Henze et al. ........................ 191/2 |
| 7,256,516 | B2  | * | 8/2007  | Buchanan et al. ............... 307/62 |
| 7,511,451 | B2  | * | 3/2009  | Pierce ............................ 320/103 |
| 2008/0067974 | A1 | * | 3/2008  | Zhang et al. .................... 320/104 |
| 2009/0278492 | A1 | * | 11/2009 | Shimizu et al. ................ 320/108 |

* cited by examiner

*Primary Examiner* — Drew A Dunn
*Assistant Examiner* — Steve T Chung
(74) *Attorney, Agent, or Firm* — Leong C. Lei

(57) ABSTRACT

The energy-efficient fast charging method is applicable to an energy-efficient fast charging device having a power conversion module and at least a fast chargeable energy storage device. The power conversion module obtains and converts an input power from an external power source, and produces an internal DC power. The method contains the following steps. First, whether an external energy storage device is connected is detected. Then, if the presence of the external energy storage device is not detected, the internal fast chargeable energy storage device is charged by the internal DC power output from the power conversion module. Otherwise, the external energy storage device is charged by the internal DC power output from the power conversion module and the stored power of the fast chargeable energy storage device simultaneously.

10 Claims, 4 Drawing Sheets

ENERGY-EFFICIENT FAST CHARGING DEVICE AND METHOD

TECHNICAL FIELD OF THE INVENTION

The present invention generally relates to charging devices and methods, and more particular to an energy-efficient and rapid charging device and method.

DESCRIPTION OF THE PRIOR ART

It is a trend to use electricity as the power source of various vehicles, replacing the use of the fossil fuel which is being depleted and whose consumption causes severe environmental issues.

Electrical vehicle usually has an energy storage device providing the required electricity, which is charged by a charging device. As shown in FIG. 1, a conventional charging device 10 is used to charge an energy storage device configured on an electrical vehicle 18. The charging device 10 contains a control module 11, a power conversion module 12, and a distribution module 13. The control module 11 is the core of the charging device 10 for controlling the power conversion module 12 and the distribution module 13. The power conversion module 12 is connected to an external power source 17 to draw AC or DC power for conversion into appropriate DC power required. The distribution module 13, under the control of the control module 11, is connected to the energy storage device 19 and delivers the converted DC power from the power conversion module 12 to charge the energy storage device 19 in a specific mode such a constant-voltage mode, constant-current mode, a pulse mode, etc.

The energy storage device 19 of the electrical vehicle 18 is usually a battery that preferably has high energy efficiency, high power density, and fully dischargeable. The conventional lead acid battery and Ni—H battery does not perform well in terms of charging speed and it usually takes more than 10 hours to charge an electrical vehicle. The recent Li battery has high safety long life, and large current/power output. The charging speed could reach above 5 C~20 C, significantly reducing the charging time. For example, if the charging speed is 12 C, the Li-battery could be fully charged in 5 minutes.

Correspondingly, the charging device 10 should have a fast charging capability so that the advantage of Li-battery could be fully exploited. Please note that fast charging is referred to the provision of large amount of electricity to the energy storage device 19 within a short duration. In other words, the charging device 10 should have an extremely high output power. In addition, the power conversion module 12, in order to support the conversion of large power electricity, should have enhanced control structure and components such as transformer of superior grades, inevitably increasing electricity demand and production cost.

On the other hand, electricity is usually billed at a rate in accordance with a user's highest consumption. Therefore, for a charging station equipped with multiple fast charging devices, it would produce a huge load at peak hours. A special arrangement with the power company and a large bill are usually inevitable. In order to sustain the demand, the power company in turn has to expand its generator capacity, not only increasing expenses but also causing resource inefficiency and violating the ideal of developing electrical vehicle in the first place. As such, the present inventor provides a novel invention to obviate the foregoing shortcomings.

SUMMARY OF THE INVENTION

Therefore, an objective of the present invention is to provide an energy-efficient fast charging device and method where at least a fast chargeable energy storage device is installed internally and charging power is stored in advance. Then, a power conversion module and internal fast chargeable energy storage device are used simultaneously to charge external energy storage device, thereby achieving low power conversion grade for the power conversion module and therefore a lower production cost. In the mean time, the power consumption from an external power source is reduced as well, thereby reducing the user's expenses and avoiding power company's over expansion for better resource efficiency.

To achieve the foregoing objective, the present invention teaches an energy-efficient fast charging method applicable to an energy-efficient fast charging device having a power conversion module and at least a fast chargeable energy storage device. The power conversion module obtains an input power from an external power source, converts the input power, and produces an internal DC power. The method contains the following steps. First, whether an external energy storage device is connected is detected. Then, if the presence of the external energy storage device is not detected, the internal fast chargeable energy storage device is charged by the internal DC power output from the power conversion module. Otherwise, if the presence of the external energy storage device is detected, the external energy storage device is charged by the internal DC power output from the power conversion module and the stored power of the fast chargeable energy storage device simultaneously.

The present invention also teaches an energy-efficient fast charging device which draws an input power from an external power source and charges an external energy storage device. The energy-efficient fast charging device contains a power conversion module, at least a fast chargeable energy storage device, a distribution module, and a control module. The power conversion module is coupled to the external power source to obtain and convert an input power into an internal DC power. The fast chargeable energy storage device is coupled to the power conversion module. The distribution module is coupled to the fast chargeable energy storage device and the power conversion module for connection to the external energy storage device. The control module is coupled to the fast chargeable energy storage device, the power conversion module, and the distribution module. The control module detects the presence of the external energy storage device and controls the rest of the components. When the presence of the external energy storage device is not detected, the control module causes the internal fast chargeable energy storage device charged by the internal DC power output from the power conversion module. Otherwise, if the presence of the external energy storage device is detected, the control module causes the external energy storage device charged by the internal DC power output from the power conversion module and the stored power of the fast chargeable energy storage device simultaneously.

The fast chargeable energy storage device could be a Li—Fe battery or a super capacitor.

The charging speed from the power conversion module to the fast chargeable energy storage device and from the distribution module to the external energy storage device is more than 1 C.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
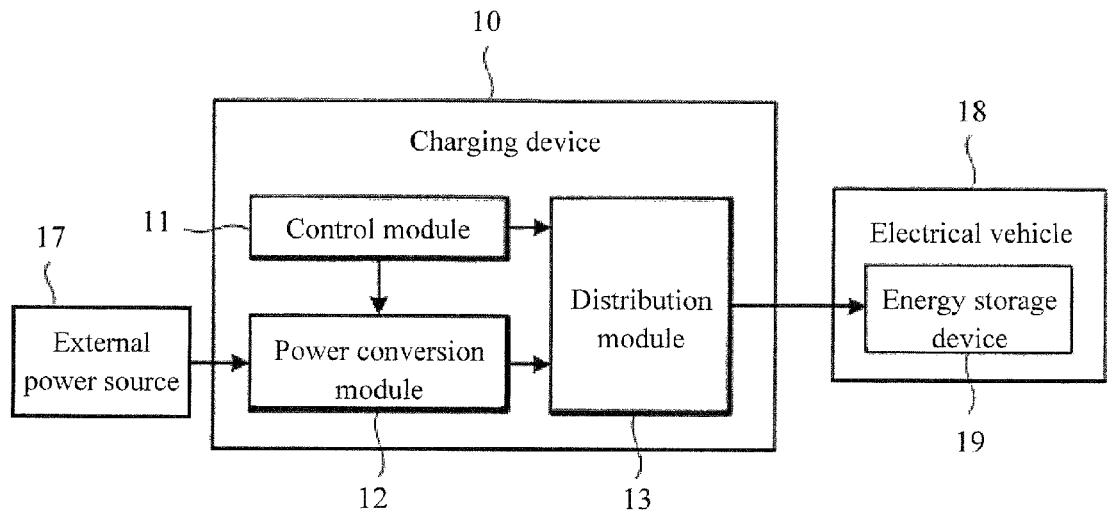
FIG. 1 is a schematic diagram showing an electrical vehicle is charged by a charging device.
Figure 2:
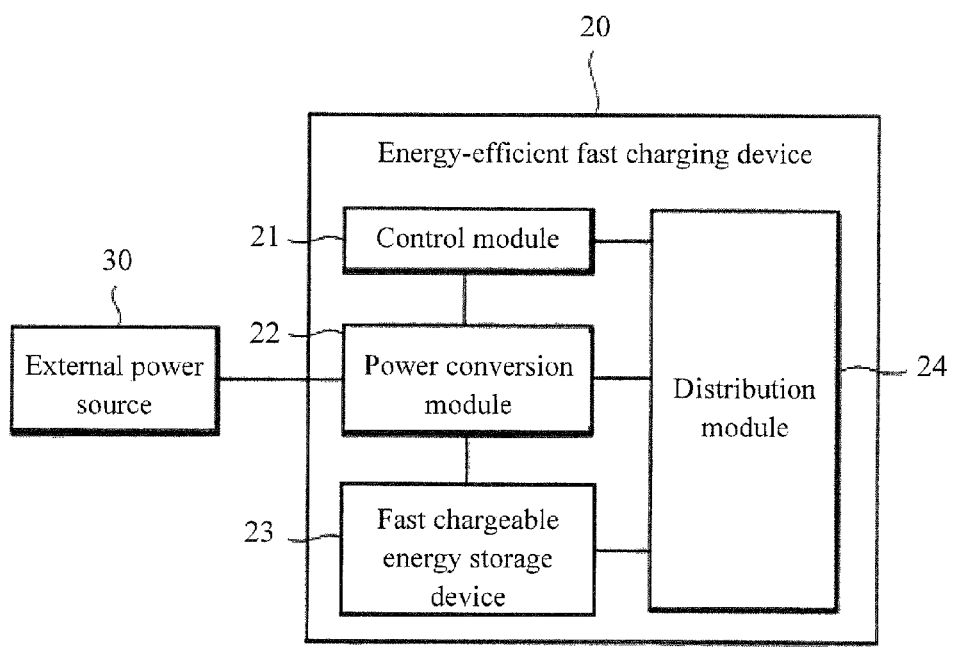
FIG. 2 is a schematic diagram showing an energy-efficient fast charging device according to a first embodiment of the present invention.
Figure 3:
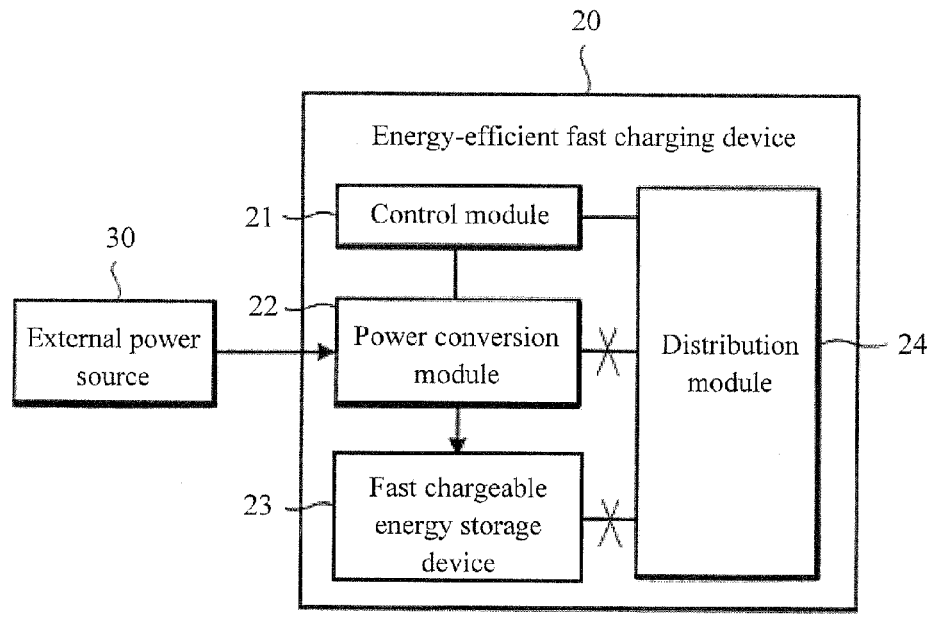
FIG. 3 is a schematic diagram showing the energy-efficient fast charging device of FIG. 2 under a storage mode.
Figure 4:
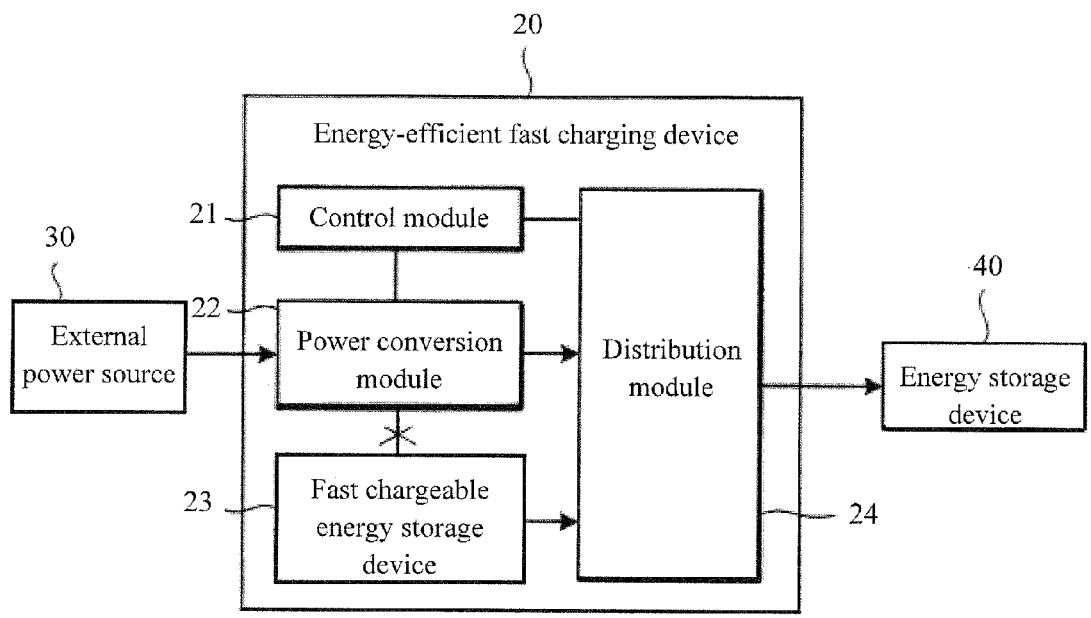
FIG. 4 is a schematic diagram showing the energy-efficient fast charging device of FIG. 2 under a charging mode.

FIG. 2 depicts an energy-efficient fast charging device according to a first embodiment of the present invention. FIG. 3 shows the energy-efficient fast charging device under a storage mode, and FIG. 4 shows the energy-efficient fast charging device under a charging mode. As illustrated, the energy-efficient fast charging device 20 is connected to an external power source 30 to draw an input power and to charge an energy storage device 40, which is a fast chargeable energy storage device such as a fast chargeable Li—Fe battery or a super capacitor installed on an electrical vehicle. Please note that fast charging is referred to a charging speed of at least 1 C.

The energy-efficient fast charging device 20 contains a control module 21, a power conversion module 22, a fast chargeable energy storage device 23, and a distribution module 1214. The control module 21 is the core of the energy-efficient fast charging device 20 and is composed of micro processor and controllers driven by internally stored firmware to follow pre-determined process to issue control signals to the power conversion module 22 and the distribution module 24.

The external power source 30 is an AC power source or a DC power source. The power conversion module 22 converts the input power into an appropriate DC power required for the operation of the energy-efficient fast charging device 20. The power conversion module 22 is controlled by the control module 21, and then selectively delivered the DC power to the fast chargeable energy storage device 23 or the distribution module 24.

In one embodiment, the external power source 30 is an AC power source drawn from the mains or from a diesel generator. The power conversion module 22 contains an AC/DC conversion circuit turning the input power from AC into DC.

In another embodiment, the external power source is a DC power source drawn from regenerative sources such as those harnessing wind or sun light. The power conversion module 22 contains a DC/DC conversion circuit turning the input power from a DC from into another DC form appropriate for the operation of the energy-efficient fast charging device 20.

Please note that the operation of the power conversion module 22 would produce a large amount of heat and therefore heat dissipation devices such as heat-sinking fins or heat pipes are usually installed on the power conversion module 22 to prevent the energy-efficient fast charging device 20 from being damaged by the excessive heat.

The fast chargeable energy storage device 23 is coupled to the power conversion module 22 and the distribution model 24, and is charged by the internal DC power output from the power conversion module 22. When a load is connected to the distribution module 24, the electricity from the fast chargeable energy storage device 23 provides auxiliary assistance to the fast charging of external devices. In practice, the fast chargeable energy storage device 23 could be a fast chargeable Li—Fe battery or a super capacitor.

The distribution module 24 is coupled to the control module 21, the power conversion module 22, and the fast chargeable energy storage device 23, for connection to an external energy storage device 40. The distribution module 24, under the control of the control module 21, receives the internal DC power from the power conversion module 22 and from the stored DC power from the fast chargeable energy storage device 23, and then outputs to the energy storage device 40 under a pre-determined transmission mode such as a constant-current mode, a constant-voltage mode, or a pulse mode modulating the amplitude of current. The hardware of the distribution module 24 is structured in accordance with the transmission mode.

A main feature of the energy-efficient fast charging device 20 is the provision of the fast chargeable energy storage device 23. Correspondingly, the control module 21 has a storage mode and a charging mode. By detecting whether the distribution module 24 is connected to the energy storage device 40, the control module 21 selectively enters the storage mode or the charging mode. For example, as shown in FIG. 3 that the energy-efficient fast charging device 20 is not connected to an external energy storage device 40, the control module 21 would detect that there is no external energy storage device 40 and would enter the storage mode where the power conversion module 22 charges the fast chargeable energy storage device 23 by the internal DC power. For another example, as shown in FIG. 4 that the energy-efficient fast charging device 20 is connected to an external energy storage device 40, the control module 21 would detect that there is an external energy storage device 40 and would enter the charging mode where the power conversion module 22 outputs the internal DC power to the distribution module 24, and the distribution module 24 is controlled to charge the energy storage device 40 by the internal DC power and the stored power of the fast chargeable energy storage device 23.

Since the energy-efficient fast charging device 20 charges the fast chargeable energy storage device 23 before being applied to charge external device, and, when it is applied to charge the energy storage device 40, the stored power of the fast chargeable energy storage device 23 and the power conversion module 23 are jointly employed, the power conversion module 22 does not require a high-power conversion structure in practice. As such, the energy-efficient fast charging device 20 could be implemented using a less expensive circuit structure.

In addition, when the energy-efficient fast charging device 20 charges the energy storage device 40, it is not achieved solely by the power conversion module 22, but is shared by the fast chargeable energy storage device 23. As such, the power drawn from the external power source is reduced and therefore less expense is incurred. This could also help the power company from overly expanding its capacity and a overall resource inefficiency.

Please note that the gist of the present invention lies in the addition of the fast chargeable energy storage device 23 in the energy-efficient fast charging device 20 and the related control modes, not in the circuit design. The power conversion module 22 and the distribution module 24 are all well-known techniques and their details are omitted here for simplicity sake.

Figure 5:
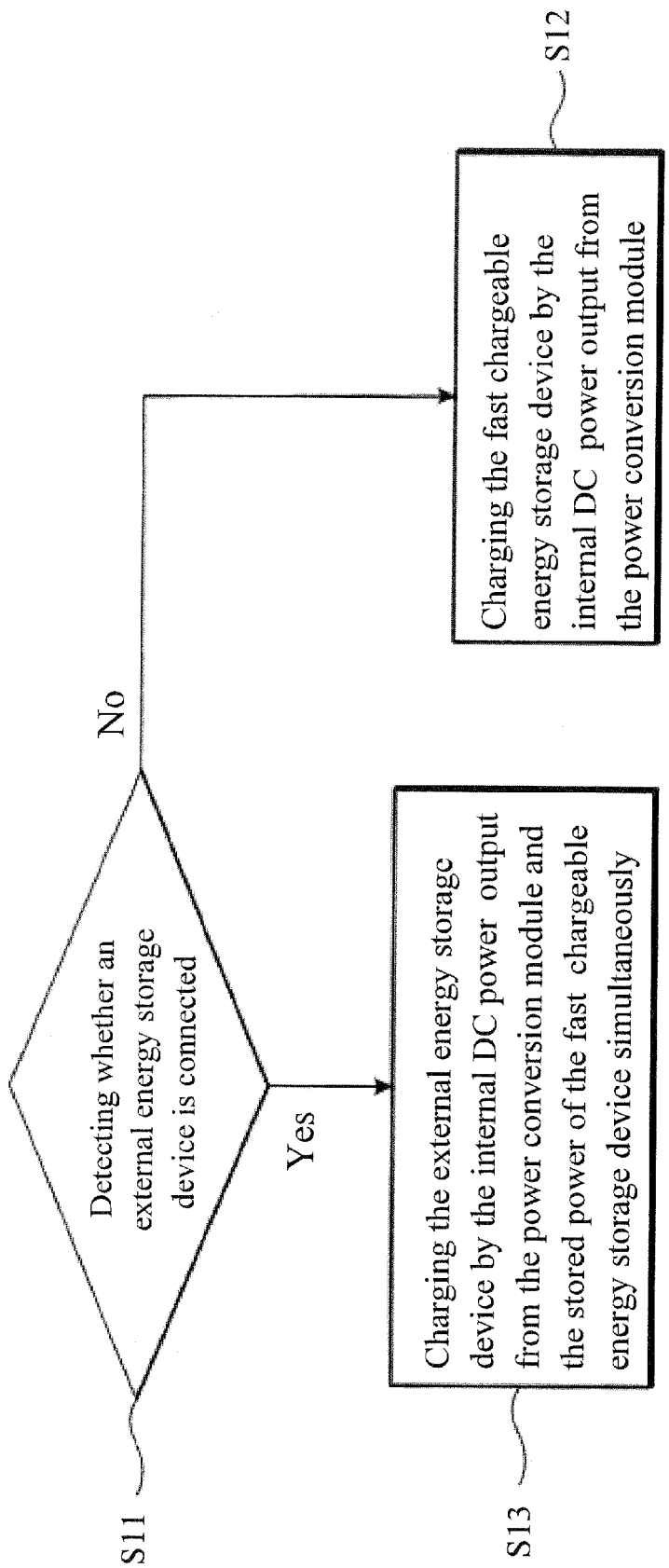
FIG. 5 is a flow diagram showing the steps of an energy-efficient fast charging method according to the present invention.

FIG. 5 is a flow diagram showing the steps of an energy-efficient fast charging method according to the present invention. Please refer to FIGS. 2 to 4 for a related system architecture. The energy-efficient fast charging method is applicable to the control of an energy-efficient fast charging device 20 and contains the following steps.

First, in step S11, the control module 21 detects whether the distribution module 24 is connected to an external energy storage device 40.

If the control module 21 does not detect the presence of the energy storage device 40 in step S11, the internal fast chargeable energy storage device 23 is charged by the internal DC power output from the power conversion module 22 in step S12.

If the control module 21 does detect the presence of the energy storage device 40 in step S11, the energy storage device 40 is charged by the internal DC power output from the power conversion module 22 and the stored power of the fast chargeable energy storage device 23 in step S13.

Figure 6:
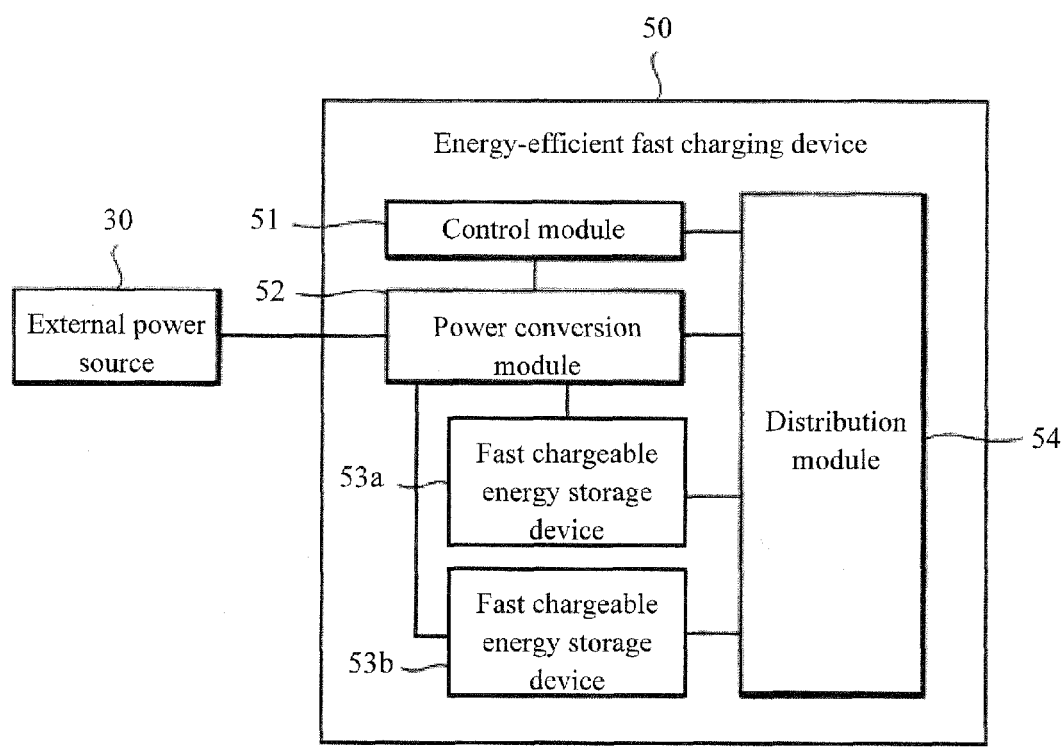
FIG. 6 is a schematic diagram showing an energy-efficient fast charging device according to a second embodiment of the present invention.

Please note that, in the previous embodiment, the energy-efficient fast charging device 20 only contains a single fast chargeable energy storage device 23. In alternative embodiments, multiple fast chargeable energy storage devices 23 could be installed so as to achieve enhanced power efficiency. As shown in FIG. 6, an energy-efficient fast charging device 50 according to a second embodiment of the present invention contains a control module 51, a power conversion module 52, two fast chargeable energy storage devices 53a and 53b, and a distribution module 54. In the present embodiment, when no external energy storage device is connected, the control module 51 controls the power conversion module 52 to sequentially charge the fast chargeable energy storage devices 53a and 53b. When an external energy storage device is connected, the fast chargeable energy storage devices 53a and 53b provides the charging power along with the power conversion module 52. As such, the power conversion grade of the power conversion module 52 and the power consumption of the external power source are further reduced.

Based on the foregoing description, the energy-efficient fast charging device and method of the present invention utilizes power conversion module and internal fast chargeable energy storage device simultaneously to charge external energy storage device, thereby achieving low power conversion grade for the power conversion module and therefore a lower production cost. In the mean time, the power consumption from the external power source is reduced as well, thereby reducing the user's expenses and avoiding power company's over expansion for better resource efficiency. Finally, the objective of pursuing environment protection by using electrical vehicles and setting up fast charging facilities is maintained.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An energy-efficient fast charging method applicable to an energy-efficient fast charging device comprising a power conversion module, at least a fast chargeable energy storage device, and a control module coupled to said fast chargeable energy storage device and said power conversion module for detecting external battery, said power conversion module obtaining and converting an input power from an external power source, and producing an internal DC power, said method comprising the following steps:
   detecting whether an external energy storage device is connected;
   if the presence of said external energy storage device is not detected, charging said internal fast chargeable energy storage device by said internal DC power output from said power conversion module; and
   if the presence of said external energy storage is detected, charging said external energy storage device by said internal DC power output from said power conversion module and the stored power of said fast chargeable energy storage device simultaneously.

2. The energy-efficient fast charging method according to claim 1, wherein said fast chargeable energy storage device is selected from the group consisting of a Li—Fe battery and a super capacitor.

3. The energy-efficient fast charging method according to claim 1, wherein the charging speed to said fast chargeable energy storage device and to said external energy storage device is more than 1 C.

4. The energy-efficient fast charging method according to claim 1, wherein said energy-efficient fast charging device has a distribution module coupled to said power conversion module and said fast chargeable energy storage device, and is connected to said external energy storage device; and said detection of the presence of said external energy storage device is detecting whether said external energy storage device is connected to said distribution module.

5. An energy-efficient fast charging device drawing an input power from an external power source and charging an external energy storage device connected to said energy-efficient fast charging device, comprising:
   a power conversion module coupled to said external power source to obtain said input power and convert said input power into an internal DC power;
   at least a fast chargeable energy storage device coupled to said power conversion module;
   a distribution module coupled to said fast chargeable energy storage device and said power conversion module for connection to said external energy storage device; and
   a control module coupled to said fast chargeable energy storage device, said power conversion module, and said distribution module, said control module detecting the presence of said external energy storage device and controls the foregoing components;

wherein, when the presence of said external energy storage device is not detected, said control module causes said internal fast chargeable energy storage device charged by said internal DC power output from said power conversion module; and, if the presence of said external energy storage device is detected, said control module causes said external energy storage device charged by said internal DC power output from said power conversion module and the stored power of said fast chargeable energy storage device simultaneously.

6. The energy-efficient fast charging device according to claim 5, wherein said fast chargeable energy storage device is selected from the group consisting of a Li—Fe battery and a super capacitor.

7. The energy-efficient fast charging device according to claim 5, wherein the charging speed from said power conversion module to said fast chargeable energy storage device and from said distribution module to said external energy storage device is more than 1 C.

8. The energy-efficient fast charging device according to claim 5, wherein said distribution module simultaneously receives said internal DC power from said power conversion module and the stored power from said fast chargeable energy storage device, and outputs to said external energy storage in a specific transmission mode for fast charging.

9. The energy-efficient fast charging device according to claim 5, wherein said input power is an AC power; and said power conversion module comprises an AC/DC power conversion circuit for converting said input power into said internal DC power.

10. The energy-efficient fast charging device according to claim 5, wherein said input power is a DC power; and said power conversion module comprises a DC/DC power conversion circuit for converting said input power into said internal DC power.

* * * * *